US007550957B2

(12) United States Patent
Ishii et al.

(10) Patent No.: US 7,550,957 B2

(45) Date of Patent: Jun. 23, 2009

(54) DC-DC CONVERTER AND CONTROL CIRCUIT THEREOF

(75) Inventors: Takuya Ishii, Osaka (JP); Hiroki Akashi, Osaka (JP); Makoto Ishimaru, Osaka (JP); Yoshiyuki Konishi, Shiga (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 11/545,050

(22) Filed: Oct. 6, 2006

(65) Prior Publication Data

US 2007/0096711 A1 May 3, 2007

(30) Foreign Application Priority Data

Oct. 27, 2005 (JP) ............................ 2005-312530

(51) Int. Cl.
*G05F 1/40* (2006.01)

(52) U.S. Cl. ...................................................... 323/282

(58) Field of Classification Search ................. 323/282, 323/283, 284, 285, 288, 351
See application file for complete search history.

(56) References Cited

U.S. PATENT DOCUMENTS 6,204,649 B1 * 3/2001 Roman ....................... 323/282
7,061,213 B2 * 6/2006 Yoshida ....................... 323/224
7,238,992 B2 * 7/2007 Komori et al. .............. 257/365
7,242,170 B1 * 7/2007 Natsume ..................... 323/222
2005/0088160 A1 * 4/2005 Tanaka et al. .............. 323/284
2005/0151521 A1 * 7/2005 Komaki ...................... 323/266

FOREIGN PATENT DOCUMENTS

JP 05-076169 3/1993

* cited by examiner

*Primary Examiner*—Adolf Berhane
(74) *Attorney, Agent, or Firm*—Harness, Dickey & Pierce, PLC

(57) ABSTRACT

The present invention is intended to provide a DC-DC converter, in which the relationship between the duty ratio of a drive signal and the output DC voltage is nonlinear, being characterized in that the relationship between an error signal and the output DC voltage is linear, and that the design of stabilizing the feedback system is facilitated. The DC-DC converter comprises an error-amplifier circuit for generating the error signal that is obtained by amplifying the error between the output and a target value, an oscillating circuit for generating a triangular wave signal having an amplitude corresponding to the error signal, and a comparison circuit for comparing the triangular wave signal with a reference signal having a predetermined value and for generating the drive signal to turn ON/OFF a switching device.

10 Claims, 7 Drawing Sheets

DC-DC CONVERTER AND CONTROL CIRCUIT THEREOF

BACKGROUND OF THE INVENTION

The present invention relates to a DC-DC converter for converting a DC input voltage into a target output voltage by repeatedly storing energy in an inductor and releasing the energy from the inductor through the ON/OFF operation of a switching device, and to a control circuit thereof.

In a power supply circuit in which an input DC voltage is input from an input DC power supply, and output DC voltages serving as power supply voltages for various electronic circuits are output, for example, when an output DC voltage higher than the input DC voltage is output, a step-up converter is used.

As a general step-up converter and its control circuit, a converter and its control circuit configured as shown in FIG. 9 are known. A first conventional step-up converter and its control circuit will be described below referring to FIG. 9. In FIG. 9, numeral 1 designates an input DC power supply, such as a battery, numeral 2 designates an inductor, numeral 3 designates a switching device formed of a MOSFET, numeral 4 designates a rectifying means formed of a diode, numeral 5 designates a smoothing means formed of a capacitor, and numeral 30 designates a control circuit. The inductor 2 and the switching device 3 are connected in series, and this series circuit is connected in parallel with the input DC power supply 1. The rectifying means 4 is connected to the connection point of the inductor 2 and the switching device 3, and the output of the rectifying means 4 is smoothed using the smoothing means 5, and an output DC voltage Vo is output. The inductor 2, the switching device 3, the rectifying means 4 and the smoothing means 5 described above constitute a step-up converter. The control circuit 30 detects the output DC voltage, supplies a drive signal DR to the switching device 3, and controls the ON/OFF operation of the switching device 3.

The control circuit 30 comprises an error-amplifier circuit 31, an oscillating circuit 32 and a comparator 33. The error-amplifier circuit 31 detects the output DC voltage Vo, and generates an error signal Ve that is obtained by amplifying the error between the output DC voltage Vo and a target value. The error signal Ve lowers when the output DC voltage Vo is higher than the target value, and rises when the output DC voltage Vo is lower than the target value. The oscillating circuit 32 generates a triangular wave signal Vt that varies according to a predetermined cycle. The amplitude of the oscillation of the triangular wave signal Vt is assumed to be Et. The comparator 33 compares the triangular wave signal Vt with the error signal Ve, and generates a drive signal DR that becomes high when the error signal Ve is larger.

FIG. 10 is a waveform diagram showing the operations of the various sections of the control circuit 30, showing the triangular wave signal Vt, the error signal Ve, and the drive signal DR. The pulse width of the drive signal DR, that is, the ON time of the switching device 3, becomes larger as the error signal Ve rises.

In FIG. 9, when the switching device 3 is ON, an input DC voltage Vi is applied to the inductor 2, a current flows from the input DC power supply 1 to the switching device 3 via the inductor 2, and energy is stored in the inductor 2. Then, when the switching device 3 is OFF, the voltage difference (Vi−Vo) between the output DC voltage Vo and the input DC voltage Vi is applied to the inductor 2, a current flows from the input DC power supply 1 to the rectifying means 4 via the inductor 2, and the energy stored in the inductor 2 is released. When it is assumed that the ratio (referred to as "duty ratio") of the ON time (the pulse width of the drive signal DR) in one switching cycle (the cycle of the triangular wave signal Vt) of the switching device 3 is D, the output DC voltage Vo is represented by $Vo=Vi/(1-D)$. The duty ratio D becomes higher as the error signal Ve rises. In other words, the duty ratio D is adjusted using the control circuit 30 so that the output DC voltage Vo reaches the target value.

The control circuit disclosed in Japanese Patent Application Laid-open No. Hei 5-76169 is known as an example of a control circuit being improved in versatility by using a clock signal instead of the triangular wave signal Vt of the control circuit 30 of the conventional step-up converter described above.

As a second conventional example, the step-up converter and its control circuit disclosed in Japanese Patent Application Laid-open No. Hei 5-76169 are described below referring to FIG. 11. In FIG. 11, the configuration of the step-up converter comprising an input DC power supply 1, an inductor 2, a switching device 3, a rectifying means 4 and a smoothing means 5 is similar to that shown in FIG. 9. Numeral 40 designates a control circuit that detects the output DC voltage of the converter, supplies a drive signal DR to the switching device 3, and controls the ON/OFF operation of the switching device 3.

The control circuit 40 comprises an error-amplifier circuit 41, an oscillating circuit 42, a constant-current source circuit 43, a capacitor 44, a comparator 45, a latch circuit 46 and a transistor 47. The error-amplifier circuit 41 detects the output DC voltage Vo, and generates an error signal Ve that is obtained by amplifying the error between the output DC voltage Vo and a target value. The error signal Ve lowers when the output DC voltage Vo is higher than the target value, and rises when the output DC voltage Vo is lower than the target value. The oscillating circuit 42 generates a clock signal Vck having a predetermined cycle and sets the latch circuit 46. The constant-current source circuit 43 outputs a constant current Io and charges the capacitor 44. The electrostatic capacitance of the capacitor 44 is assumed to be C4. The comparator 45 compares the error signal Ve with the charged voltage V4 of the capacitor 44. When the charged voltage V4 of the capacitor 44 is higher than the error signal Ve, the comparator 44 outputs a high level signal, and resets the latch circuit 46. The output Q of the latch circuit 46 becomes high when the latch circuit 46 is set, and becomes low when the latch circuit 46 is reset, whereby the latch circuit 46 generates the drive signal DR. The drive signal DR is input to the gate of the switching device 3, turning ON the switching device 3 when the drive signal DR is high, and turning OFF the switching device 3 when the drive signal DR is low. On the other hand, the inverted output QB of the latch circuit 46 drives the transistor 47 so that the capacitor 44 is short-circuited and discharged while the drive signal DR is low, that is, while the switching device 3 is OFF.

FIG. 12 is a waveform diagram showing the operations of the various sections of the control circuit 40, showing the clock signal Vck, the error signal Ve, the charged voltage V4 of the capacitor 44, the reset signal R supplied to the latch circuit 46, and the drive signal DR. The pulse width of the drive signal DR, that is, the ON time of the switching device 3, becomes larger as the error signal Ve rises.

In the step-up converters according to the conventional examples configured as described above, the relationship between the error signal Ve and the duty ratio D is linear. However, the relationship between the duty ratio D and the output DC voltage Vo is represented by $Vo=Vi/(1-D)$ and nonlinear.

For example, in the case of the first conventional step-up converter and its control circuit 30 shown in FIG. 9, when it is assumed that the triangular wave signal Vt changes between 0 and Et for the sake of simplicity, the duty ratio D is represented by D=Ve/Et using the error signal Ve. The output DC voltage Vo is thus represented by Expression (1) described below.

$$Vo=Vi/(1-D)=Vi\cdot Et/(Et-Ve) \quad (1)$$

In other words, the tendency (∂Vo/∂Ve) of increasing the output DC voltage Vo becomes larger as the error signal Ve rises.

On the other hand, in the case of the second conventional step-up converter and its control circuit 40, the ON time Ton of the switching device 3 is represented by Ton=Ve·C4 Io using the error signal Ve, the electrostatic capacitance C4 of the capacitor 44 and the constant current Io. When it is assumed that the cycle of the clock signal Vck, that is, the switching cycle, is Ts, the output DC voltage Vo is represented by Expression (2) described below because the duty ratio D=Ton/Ts.

$$\begin{aligned} Vo &= Vi\cdot Ts/(Ts-Ton) \\ &= Vi\cdot Ts/(Ts-Ve\cdot C4/Io) \end{aligned} \quad (2)$$

Hence, (∂Vo/∂Ve) becomes larger as the error signal Ve rises, just as in the case of the first conventional example. This indicates that, as the output DC voltage Vo is higher than the input DC voltage Vi, the output DC voltage Vo fluctuates significantly when the error signal Ve changes slightly, causing a problem of making the output DC voltage Vo easy to become unstable.

SUMMARY OF THE INVENTION

The present invention is intended to provide a DC-DC converter, in which the relationship between the duty ratio D and the output DC voltage Vo is nonlinear as in the case of a step-up converter for example, being characterized in that the relationship between the error signal Ve and the output DC voltage Vo is linear, and that the design of stabilizing its feedback system is facilitated, and to provide a control circuit thereof.

For the purpose of attaining the object described above, a DC-DC converter according to a first aspect of the present invention, having a switching device that is turned ON and OFF repeatedly, and an inductor that stores energy from the input during the ON period of the switching device and releases the energy to the output during the OFF period of the switching device, comprises an error-amplifier circuit for generating an error signal that is obtained by amplifying the error between the output and a target value, an oscillating circuit for generating a triangular wave signal having an amplitude corresponding to the error signal, and a comparison circuit for comparing the triangular wave signal with a reference signal having a predetermined value and for generating a drive signal to turn ON/OFF the switching device.

A DC-DC converter according to a second aspect of the present invention is characterized in that the oscillating circuit of the DC-DC converter according to the first aspect described above generates a triangular wave signal having an amplitude being proportionate to the magnitude of the error signal.

A DC-DC converter according to a third aspect of the present invention is characterized in that the oscillating circuit of the DC-DC converter according to the second aspect described above comprises a current source circuit for outputting a current being proportionate to the magnitude of the error signal, a clock signal generator for generating a clock signal having a predetermined frequency, a discharge switch that is turned ON and OFF according to the clock signal, and a capacitor that is charged using the current source circuit and discharged using the discharge switch, and that the triangular wave signal has the waveform of the charging/discharging voltage of the capacitor.

A DC-DC converter according to a fourth aspect of the present invention is characterized in that the comparison circuit of the DC-DC converter according to the first aspect described above compares the triangular wave signal with a reference signal having a magnitude corresponding to the input voltage.

A DC-DC converter according to a fifth aspect of the present invention is characterized in that the comparison circuit of the DC-DC converter according to the first aspect described above compares the triangular wave signal with a reference signal having a magnitude that decreases from a level higher than the predetermined value at the time of startup to the predetermined value with the passage of time.

The control circuit of a DC-DC converter according to a sixth aspect of the present invention, having a switching device that is turned ON and OFF repeatedly, and an inductor that stores energy from the input during the ON period of the switching device and releases the energy to the output during the OFF period of the switching device, comprises an error-amplifier circuit for generating an error signal that is obtained by amplifying the error between the output and a target value, an oscillating circuit for generating a triangular wave signal having an amplitude corresponding to the error signal, and a comparison circuit for comparing the triangular wave signal with a reference signal having a predetermined value and for generating a drive signal to turn ON/OFF the switching device.

The control circuit of a DC-DC converter according to a seventh aspect of the present invention is characterized in that the oscillating circuit of the control circuit of the DC-DC converter according to the sixth aspect described above generates a triangular wave signal having an amplitude being proportionate to the magnitude of the error signal.

The control circuit of a DC-DC converter according to an eighth aspect of the present invention is characterized in that the oscillating circuit of the control circuit of the DC-DC converter according to the seventh aspect described above comprises a current source circuit for outputting a current being proportionate to the magnitude of the error signal, a clock signal generator for generating a clock signal having a predetermined frequency, a discharge switch that is turned ON and OFF according to the clock signal, and a capacitor that is charged using the current source circuit and discharged using the discharge switch, and that the triangular wave signal has the waveform of the charging/discharging voltage of the capacitor.

The control circuit of a DC-DC converter according to a ninth aspect of the present invention is characterized in that the comparison circuit of the control circuit of the DC-DC converter according to the sixth aspect described above compares the triangular wave signal with a reference signal having a magnitude corresponding to the input voltage.

The control circuit of a DC-DC converter according to a tenth aspect of the present invention is characterized in that the comparison circuit of the control circuit of the DC-DC converter according to the sixth aspect described above compares the triangular wave signal with a reference signal having a magnitude that decreases from a level higher than the predetermined value at the time of startup to the predetermined value with the passage of time.

In the DC-DC converter and its control circuit according to the present invention, the DC-DC converter, in which the relationship between the duty ratio and the output DC voltage is nonlinear, can linearize the relationship between the output DC voltage and the error signal that is obtained by amplifying the error between the output DC voltage and a target value. Hence, the DC-DC converter has an effect of facilitating the design of stabilizing the feedback system thereof because the operation is stable even at a high duty ratio. In addition, the DC-DC converter has effects of facilitating the setting of the maximum duty ratio, the correction of the maximum duty ratio using the input voltage, and the setting of soft start.

DETAILED DESCRIPTION OF THE PREFERRED EMBODIMENTS

Preferred embodiments of a DC-DC converter and its control circuit according to the present invention will be described below referring to the accompanying drawings.

First Embodiment

Figure 1:
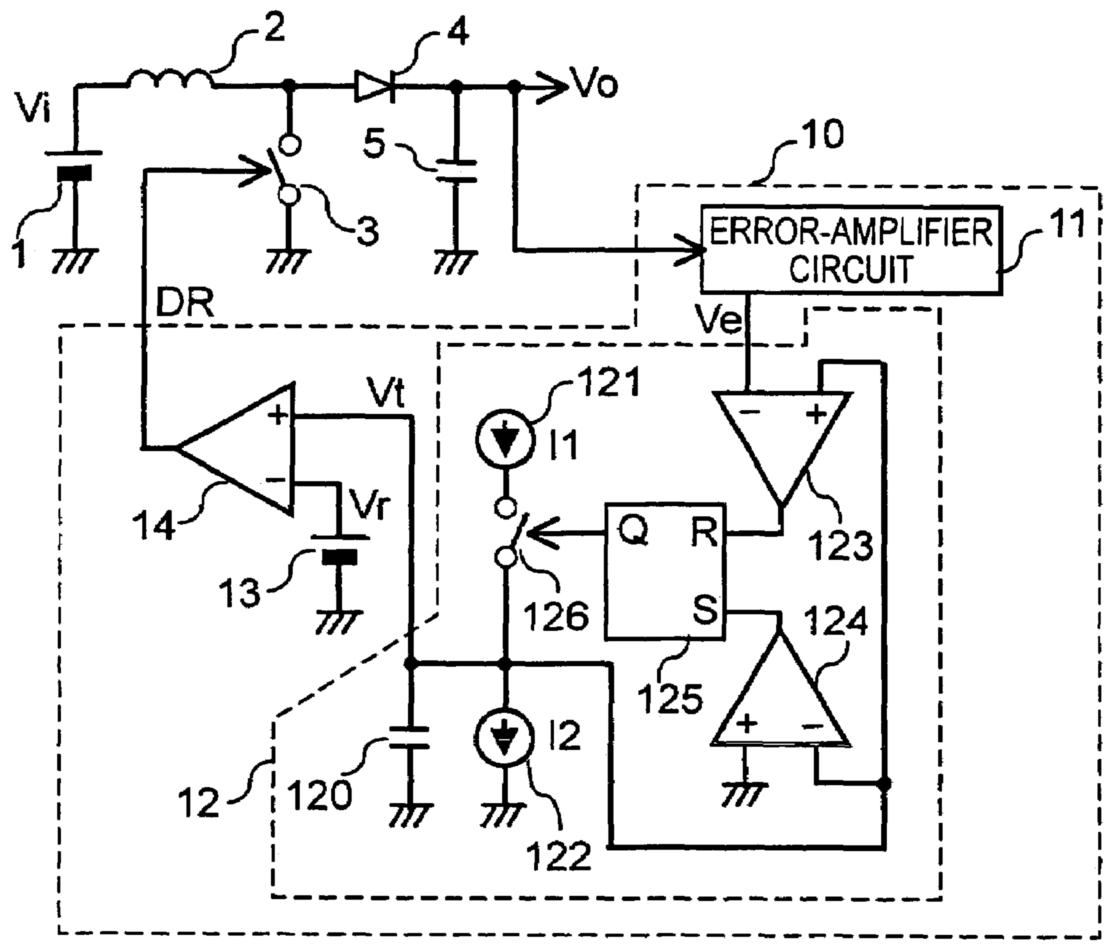
FIG. 1 is a circuit diagram showing the configuration of a DC-DC converter and its control circuit according to a first embodiment of the present invention.

FIG. 1 is a circuit diagram showing the configuration of a DC-DC converter and its control circuit according to a first embodiment of the present invention.

As shown in FIG. 1, an input DC power supply 1, such as a battery, is connected to one terminal of an inductor 2. To the other terminal of the inductor 2, one terminal of a switching device 3 formed of a MOSFET and one terminal of a rectifying means 4 formed of a diode are connected. The other terminal of the switching device 3 is grounded. One terminal of a smoothing means 5 formed of a capacitor is grounded, and the other terminal thereof is connected to the other terminal of the rectifying means 4. Furthermore, the other terminal of the rectifying means 4 serves as an output terminal and is connected to a control circuit 10. The inductor 2 and the switching device 3 are connected in series, and this series circuit is connected in parallel with the input DC power supply 1. The rectifying means 4 is connected to the connection point of the inductor 2 and the switching device 3. The output of the rectifying means 4 is smoothed using the smoothing means 5, and an output DC voltage Vo is output. The inductor 2, the switching device 3, the rectifying means 4 and the smoothing means 5 described above constitute a step-up converter. The control circuit 10 detects the output DC voltage, supplies a drive signal DR to the switching device 3, and controls the ON/OFF operation of the switching device.

In FIG. 1, the control circuit 10 comprises an error-amplifier circuit 11 for generating an error signal Ve that is obtained by amplifying the error between the output DC voltage Vo and a target value, an oscillating circuit 12 for generating a triangular wave signal Vt whose amplitude is the level of the error signal Ve, a voltage source circuit 13 for generating a reference signal Vr, and a comparison circuit 14 for comparing the triangular wave signal Vt with the reference signal Vr and for outputting the drive signal DR to turn ON/OFF the switching device 3.

In FIG. 1, the oscillating circuit 12 comprises a capacitor 120, a constant-current source circuit 121 for charging the capacitor 120 using a constant current I1, a constant-current source circuit 122 for discharging the capacitor 120 using a constant current I2 ($I2<I1$), a comparator 123 for comparing the voltage of the capacitor 120 with the error signal Ve, a comparator 124 for comparing the voltage of the capacitor 120 with the ground potential, a latch circuit 125 to which the outputs of the comparator 123 and the comparator 124 are input, and a switch 126 for turning ON/OFF the charging current of the capacitor 120 using the output of the latch circuit 125. The voltage of the capacitor 120 has a triangular waveform and is output as the triangular wave signal Vt as described below.

The operation of the step-up converter will be described below. When the switching device 3 is ON, an input DC voltage Vi is applied to the inductor 2, a current flows from the input DC power supply 1 to the switching device 3 via the inductor 2, and energy is stored in the inductor 2. Then, when the switching device 3 is OFF, the voltage difference ($Vi-Vo$) between the input DC voltage Vi and the output DC voltage Vo is applied to the inductor 2, a current flows from the input DC power supply 1 to the rectifying means 4 via the inductor 2, and the energy stored in the inductor 2 is released. When it is assumed that the ratio (referred to as "duty ratio") of the ON time (the pulse width of the drive signal DR) in one switching cycle (the cycle of the triangular wave signal Vt) of the switching device 3 is D, the output DC voltage Vo is represented by $Vo=Vi/(1-D)$. The control circuit 10 detects the output DC voltage Vo and adjusts the duty ratio D so that the output DC voltage Vo reaches the target value, as described below using FIGS. 1 and 2.

Figure 2:
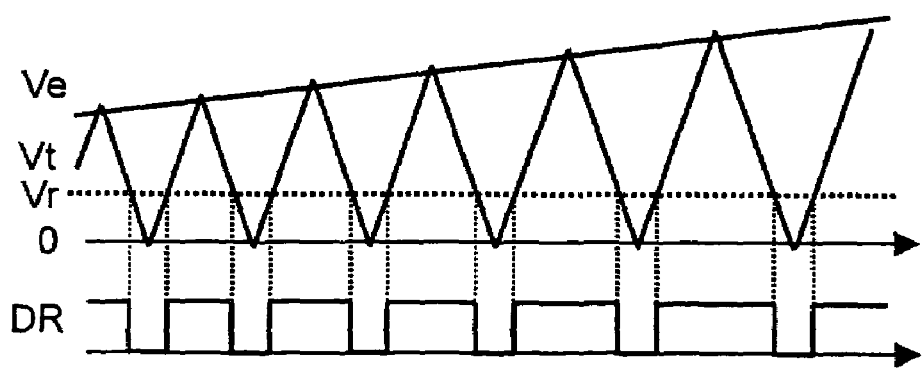
FIG. 2 is a waveform diagram showing the operations of the various sections of the control circuit of the DC-DC converter according to the first embodiment of the present invention.

FIG. 2 is a waveform diagram showing the operations of the various sections of the control circuit 10, showing the error signal Ve, the triangular wave signal Vt, the reference signal Vr and the drive signal DR. In FIG. 1, the error signal Ve generated using the error-amplifier circuit 11 rises when the output DC voltage Vo is lower than the target value, and lowers when the output DC voltage Vo is higher than the target value. The error signal Ve is compared with the triangular wave signal Vt serving as the voltage of the capacitor 120 using the comparator 123. When the output Q of the latch circuit 125 is high, the switch 126 is ON, whereby the capacitor 120 is charged using the constant current (I1−I2). When the voltage (the triangular wave signal Vt) of the capacitor 120 rises and reaches the error signal Ve, the output of the comparator 123 is inverted and becomes high, and the latch circuit 125 is reset. When the output Q of the latch circuit 125 becomes low, the switch 126 is turned OFF, and the capacitor 120 is discharged using the constant current I2. The voltage (the triangular wave signal Vt) of the capacitor 120 becomes lower than the error signal Ve, and the output of the comparator 123 becomes low. When the voltage (the triangular wave signal Vt) of the capacitor 120 lowers and reaches the ground potential, the output of the comparator 124 is inverted and become high, and the latch circuit 125 is set. When the output Q of the latch circuit 125 becomes high, the switch 126 is turned ON. As a result, the capacitor 120 is charged using the constant current (I1−I2). The above-mentioned operation is repeated, and the voltage (the triangular wave signal Vt) of the capacitor 120 becomes a triangular wave signal changing between the ground potential and the error signal Ve as shown in FIG. 2. When it is assumed that the electrostatic capacitance of the capacitor 120 is C1 and that I1=2×I2, for the sake of simplicity, the cycle Ts of the triangular wave signal Vt is represented by Ts=C1·Ve/I1.

The triangular wave signal Vt is compared with the reference signal Vr using the comparison circuit 14. When the triangular wave signal Vt is higher than the reference signal Vr, the drive signal DR becomes high. The pulse width of the drive signal DR, that is, the ON time Ton of the switching device 3, is represented by Ton=Ts·(1−Vr/Ve). Hence, the duty ratio D is represented by Expression (3) described below.

$$D=Ton/Ts=1-Vr/Ve \tag{3}$$

In other words, the duty ratio D becomes higher as the error signal Ve rises as shown in FIG. 2. On the other hand, the output DC voltage Vo is represented by Vo=Vi/(1−D). For example, when the output DC voltage Vo is lower than the target value, the error signal Ve rises, and the duty ratio D becomes higher accordingly. As a result, the duty ratio D is adjusted so that the output DC voltage Vo reaches the target value.

In the steady state of the control circuit of the DC-DC converter according to Embodiment 1 of the present invention, wherein the output DC voltage Vo is stabilized, the relationships represented by Expressions (4) and (5) described below are established.

$$Vo=Vi/(1-D)=Vi\cdot Ve/Vr \tag{4}$$

$$\partial Vo/\partial Ve=Vi/Vr \tag{5}$$

As described above, the relationship between the error signal Ve and the output DC voltage Vo is linear, and the rate of change (∂Vo/∂Ve) of the output DC voltage Vo due to the error signal Ve does not depend on the level of the error signal Ve. For this reason, the design of stabilizing the feedback system is facilitated.

Furthermore, because the duty ratio D is determined by the error signal Ve and the reference signal Vr as indicated in Expression (3), the maximum duty ratio Dmax can be set using the maximum value of the error signal Ve and the reference signal Vr.

Second Embodiment

Figure 3:
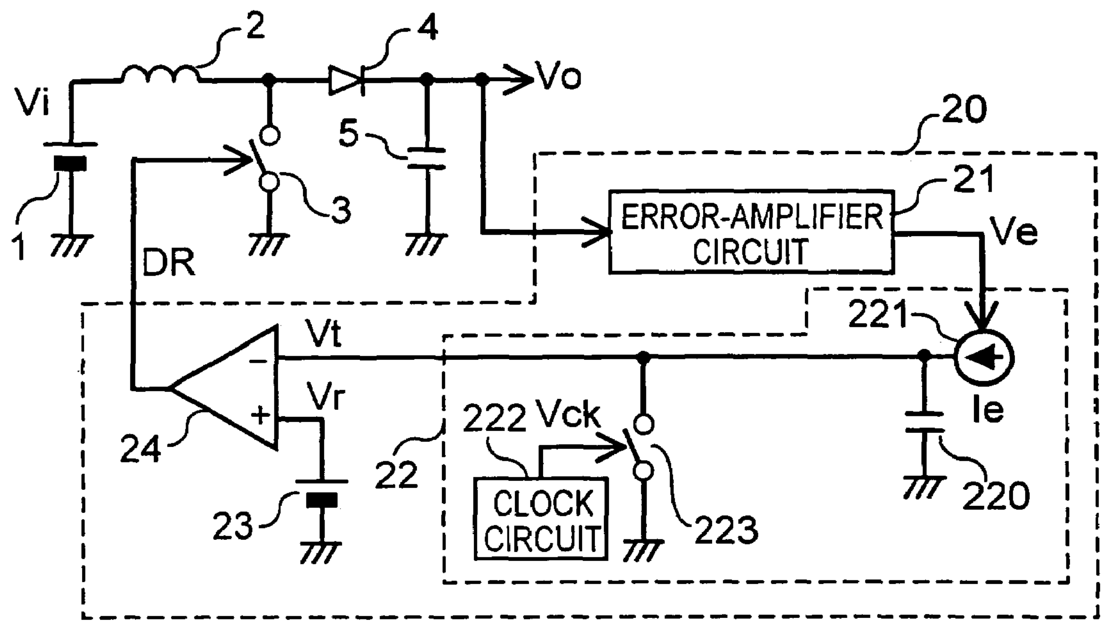
FIG. 3 is a circuit diagram showing the configuration of a DC-DC converter and its control circuit according to a second embodiment of the present invention.

FIG. 3 is a circuit diagram showing the configuration of a DC-DC converter and its control circuit according to a second embodiment of the present invention. In FIG. 3, the components having the same functions and configurations as those of the DC-DC converter and its control circuit according to the above-mentioned first embodiment shown in FIG. 1 are designated by the same numerals, and their descriptions are omitted. The second embodiment differs from the first embodiment shown in FIG. 1 in the configuration of the control circuit, and the control circuit according to the second embodiment is referred to as a control circuit 20 so as to be distinguished from the control circuit configured as shown in FIG. 1.

In FIG. 3, the control circuit 20 comprises an error-amplifier circuit 21 for generating an error signal Ve that is obtained by amplifying the error between the output DC voltage Vo and a target value, an oscillating circuit 22 for generating a triangular wave signal Vt whose amplitude is the level of the error signal Ve, a voltage source circuit 23 for generating a reference signal Vr, and a comparison circuit 24 for comparing the triangular wave signal Vt with the reference signal Vr and for outputting the drive signal DR to turn ON/OFF the switching device 3.

In FIG. 3, the oscillating circuit 22 comprises a capacitor 220, a current source circuit 221 that receives the error signal Ve and charges the capacitor 220 using a current Ie being proportionate to the error signal Ve, a clock circuit 222 that outputs a clock signal Vck having a predetermined frequency, and a switch 223 that is driven using the clock signal Vck and short-circuits and discharges the capacitor 220 so that its voltage reaches the ground potential. Furthermore, it is assumed that ON time Td during which the clock signal Vck is high is set short to the extent that the capacitor 220 can be short-circuited and discharged. The voltage of the capacitor 220 has a triangular waveform and is output as the triangular wave signal Vt as described below.

Figure 4:
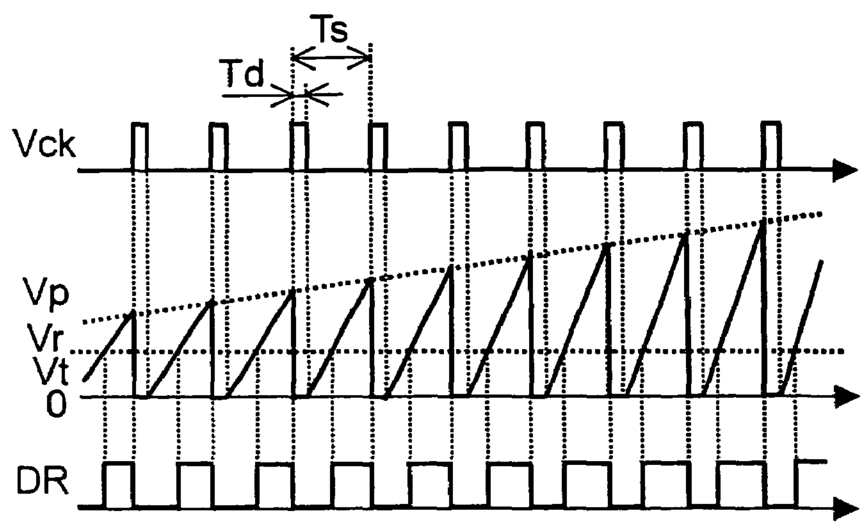
FIG. 4 is a waveform diagram showing the operations of the various sections of the control circuit of the DC-DC converter according to the second embodiment of the present invention.

The operations of the DC-DC converter and its control circuit 20 according to the second embodiment will be described below referring to FIGS. 3 and 4. FIG. 4 is a waveform diagram showing the operations of the various sections of the control circuit 20, showing the clock signal Vck, the triangular wave signal Vt, the reference signal Vr and the drive signal DR. In FIG. 3, the error signal Ve generated using the error-amplifier circuit 21 rises when the output DC voltage Vo is lower than the target value, and lowers when the output DC voltage Vo is higher than the target value. The current source circuit 221 outputs a current Ie being proportionate to the error signal Ve and charges the capacitor 220. When the clock signal Vck is high, the switch 223 is ON, whereby the capacitor 220 is short-circuited and discharged so that its voltage vt reaches the ground potential. Because the voltage Vt of the capacitor 220 is lower than the reference signal Vr, the output of the comparison circuit 24, that is, the drive signal DR, is low. When the clock signal Vck becomes low, the switch 223 is turned OFF, and the capacitor 220 is charged using the current Ie. When the voltage (the triangular wave signal Vt) of the capacitor 220 rises and reaches the reference signal Vr, the output of the comparison circuit 24, the drive signal DR, is inverted and becomes high, and the switching device 3 is turned ON. The charging of the capacitor 220 continues until the clock signal Vck becomes high. When the clock signal Vck becomes high, the switch 223 is turned ON, and the capacitor 220 is short-circuited and discharged so that its voltage vt reaches the ground potential. The voltage Vt of the capacitor 220 becomes lower than the reference signal Vr, the output of the comparison circuit 24, the drive signal DR, is inverted and becomes low, and the switching device 3 is turned OFF. The above-mentioned operation is repeated, and the voltage of the capacitor 220 becomes the triangular wave signal Vt changing between the ground potential and the peak voltage Vp of the triangular wave signal as shown in FIG. 4.

When it is assumed that the cycle of the clock signal Vck is Ts, that the ON time Td of the clock signal Vck is negligible in comparison with the cycle Ts, that the electrostatic capacitance of the capacitor 220 is C2, that the resistance value of the current source circuit 221 is Re, and that the relationship of Ie=Ve/Re is established, the peak voltage Vp of the triangular wave signal Vt is represented by Expression (6) described below.

$$\begin{aligned} Vp &= (Ts - Td) \cdot Ie / C2 \\ &\approx Ts \cdot Ve / (C2 \cdot Re) \end{aligned} \tag{6}$$

The triangular wave signal Vt is compared with the reference signal Vr using the comparison circuit 24. When the triangular wave signal Vt is higher than the reference signal Vr, the drive signal DR becomes high. The pulse width of the drive signal DR, that is, the ON time Ton of the switching device 3, is represented by Expression (7) described below.

$$\begin{aligned} Ton &= (Ts - Td) \cdot (1 - Vr / Vp) \\ &\approx Ts - Vr \cdot C2 \cdot Re / Ve \end{aligned} \tag{7}$$

Hence, the duty ratio D is represented by Expression (8) described below.

$$\begin{aligned} D &= Ton / Ts \\ &= 1 - (C2 \cdot Re / Ts) \cdot (Vr / Ve) \end{aligned} \tag{8}$$

In other words, the duty ratio D becomes higher as the peak voltage Vp being proportionate to the error signal Ve rises as shown in FIG. 4. On the other hand, the output DC voltage Vo is represented by Vo=Vi/(1−D). For example, when the output DC voltage Vo is lower than the target value, the error signal Ve rises, and the duty ratio D becomes higher accordingly. As a result, the duty ratio D is adjusted so that the output DC voltage Vo reaches the target value.

In the steady state of the control circuit of the DC-DC converter according to Embodiment 2 according to the present invention, wherein the output DC voltage Vo is stabilized, the relationships represented by Expressions (9) and (10) described below are established.

$$\begin{aligned} Vo &= Vi / (1 - D) \\ &= Vi \cdot Ve \cdot Ts / (Vr \cdot C2 \cdot Re) \end{aligned} \tag{9}$$

$$\partial Vo / \partial Ve = Vi \cdot Ts / (Vr \cdot C2 \cdot Re) \tag{10}$$

As described above, the relationship between the error signal Ve and the output DC voltage Vo is linear, and the rate of change (∂Vo/∂Ve) of the output DC voltage Vo due to the error signal Ve does not depend on the level of the error signal Ve. For this reason, the design of stabilizing the feedback system is facilitated. It is possible that the control circuit of the DC-DC converter according to the second embodiment is configured so that switching is carried out in synchronization with the clock signal Vck.

In this embodiment, it is assumed that the pulse width of the clock signal Vck is negligibly small in comparison with the switching cycle, for the sake of simplicity. However, the clock signal Vck is not limited to have this kind of shape. For example, when it is desired that the DC-DC converter according to the second embodiment is operated in synchronization with the clock signal having a predetermined pulse width, the capacitor 220 should only be short-circuited and discharged so that its voltage reaches the ground potential, in synchronization with the rising edge of the clock signal.

In addition, because the duty ratio D is determined by the error signal Ve and the reference signal Vr as indicated in Expression (8), the maximum duty ratio Dmax can be set using the maximum value of the error signal Ve and the reference signal Vr.

Third Embodiment

Figure 5:
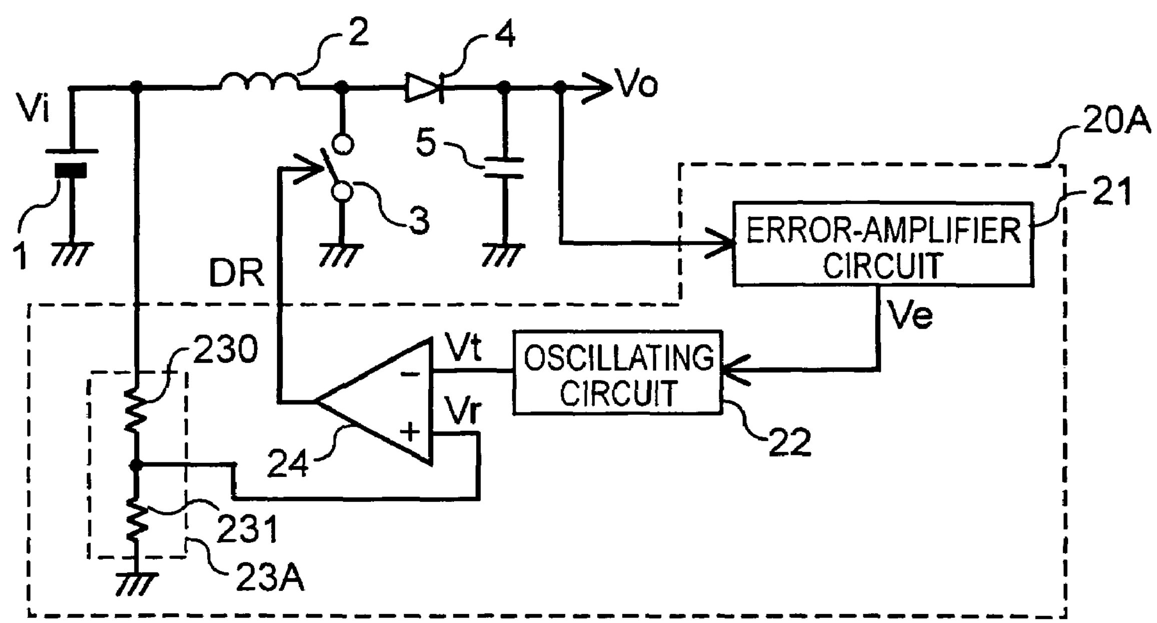
FIG. 5 is a circuit diagram showing the configuration of a DC-DC converter and its control circuit according to a third embodiment of the present invention.

FIG. 5 is a circuit diagram showing the configuration of a DC-DC converter and its control circuit according to a third embodiment of the present invention. In FIG. 5, the components having the same functions and configurations as those of the DC-DC converter and its control circuit according to the above-mentioned second embodiment shown in FIG. 3 are designated by the same numerals, and their descriptions are omitted. The third embodiment differs from the second embodiment shown in FIG. 3 in the configuration of the control circuit, and the control circuit according to the third embodiment is referred to as a control circuit 20A so as to be distinguished from the control circuit configured as shown in FIG. 3.

The configuration of the control circuit 20A shown in FIG. 5 and comprising an error-amplifier circuit 21, an oscillating circuit 22 and a comparison circuit 24 is similar to that of the control circuit 20 shown in FIG. 3. The control circuit 20A differs from the control circuit 20 in that a voltage source circuit 23A comprising a series circuit of a resistor 230 and a resistor 231 is used instead of the voltage source circuit 23 that is shown in FIG. 3 and generates the reference signal Vr. The voltage obtained by dividing the input DC voltage Vi using the resistors of the voltage source circuit 23A is used as the reference signal Vr, and the reference signal Vr is compared with the triangular wave signal Vt using the comparison circuit 24. When it is assumed that the resistance division ratio obtained using the resistors 230 and 231 is α, the relationship between the reference signal Vr and the input DC voltage Vi is represented by Expression (11) described below.

$$Vr = \alpha \cdot Vi \tag{11}$$

In the DC-DC converter according to the third embodiment, the operations of the step-up converter and its control circuit are the same as those of the DC-DC converter and its control circuit according to the above-mentioned second embodiment, except for the relationship indicated in Expression (11). When Expression (11) is substituted into Expressions (8) to (10), relationship expressions (12) to (14) described below are obtained.

$$D = 1 - (C2 \cdot Re / Ts) \cdot (\alpha \cdot Vi / Ve) \quad (12)$$

$$Vo = Vi / (1 - D) = Ve \cdot Ts / (\alpha \cdot C2 \cdot Re) \quad (13)$$

$$\partial Vo / \partial Ve = Ts / (\alpha \cdot C2 \cdot Re) \quad (14)$$

As described above, the relationship between the error signal Ve and the output DC voltage Vo is linear, and the rate of change (∂Vo/∂Ve) of the output DC voltage Vo due to the error signal Ve does not depend on the level of the error signal Ve. In addition, the rate of change does not depend on the input DC voltage Vi, either. For this reason, there is almost no fluctuation in the error signal Ve during ordinary stabilized operation. Because the output of the error-amplifier circuit 21 for generating the error signal Ve has a narrow dynamic range, the design can be facilitated.

Furthermore, because the duty ratio D is determined by the error signal Ve and the input DC voltage Vi as indicated in Expression (12), the maximum duty ratio Dmax can be set using the maximum value of the error signal Ve and the input DC voltage Vi. In other words, the higher the input DC voltage Vi, the smaller the maximum duty ratio Dmax. The magnetic energy to be stored in the inductor 2 is proportionate to the product of the applied voltage and the application time of the voltage. The product of the voltage and the time becomes maximum, Vimax×Dmax×Ts, at a transient time, for example, when the maximum input is supplied. When it is assumed that the maximum duty ratio Dmax is constant, this value is unnecessarily large in comparison with the value obtained during ordinary operation, causing the size of the inductor 2 larger. However, because the maximum duty ratio Dmax is set so as to be smaller as the input DC voltage Vi is higher as described above, the upper limit value of the magnetic energy to be stored in the inductor 2 is restricted, and the inductor 2 can be made small in size.

Fourth Embodiment

Figure 6:
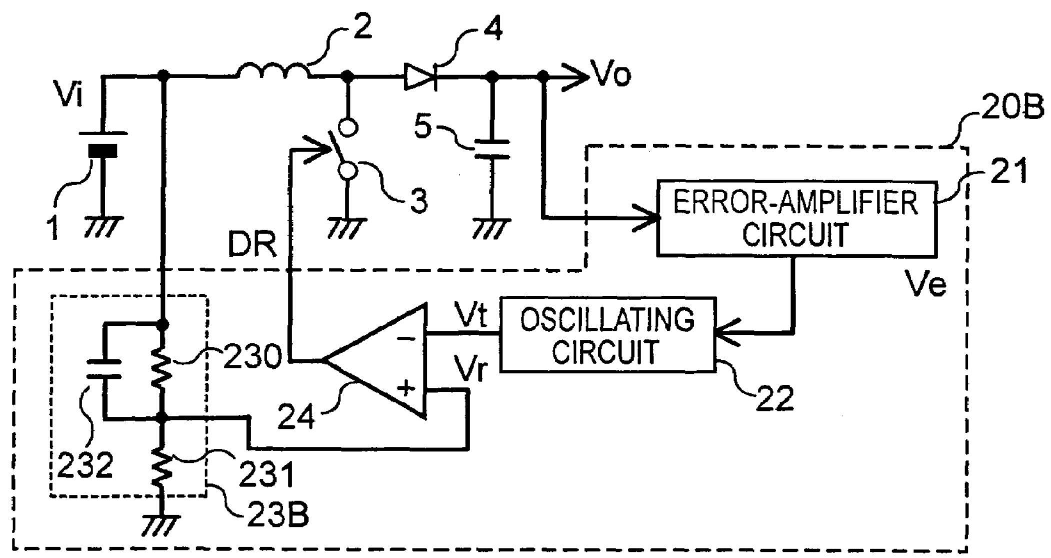
FIG. 6 is a circuit diagram showing the configuration of a DC-DC converter and its control circuit according to a fourth embodiment of the present invention.

FIG. 6 is a circuit diagram showing the configuration of a DC-DC converter and its control circuit according to a fourth embodiment of the present invention. In FIG. 6, the components having the same functions and configurations as those of the DC-DC converter and its control circuit according to the above-mentioned third embodiment shown in FIG. 5 are designated by the same numerals, and their descriptions are omitted. The fourth embodiment differs from the third embodiment shown in FIG. 5 in the configuration of the control circuit, and the control circuit according to the fourth embodiment is referred to as a control circuit 20B so as to be distinguished from the control circuit configured as shown in FIG. 5.

The configuration of the control circuit 20B shown in FIG. 6 and comprising an error-amplifier circuit 21, an oscillating circuit 22 and a comparison circuit 24 is similar to that of the control circuit 20 shown in FIG. 3. The control circuit 20B differs from the control circuit 20 in that a voltage source circuit 23B comprising a series circuit of a resistor 230 and a resistor 231 and a capacitor 232 connected in parallel with the resistor 230 is used instead of the voltage source circuit 23A shown in FIG. 5. The voltage obtained by dividing the input DC voltage Vi using the resistors of the voltage source circuit 23B is used as the reference signal Vr, and the reference signal Vr is compared with the triangular wave signal Vt using the comparison circuit 24. When it is assumed that the resistance division ratio obtained using the resistors 230 and 231 is α during ordinary operation, expression Vr=α·Vi is established, and relationship expressions Vo=Ve·Ts/(α·C2·Re) and ∂Vo/∂Ve=Ts/(α·C2·Re) are obtained. The relationship between the error signal Ve and the output DC voltage Vo thus becomes linear. The rate of change (∂Vo/∂Ve) of the output DC voltage Vo due to the error signal Ve does not depend on the level of the error signal Ve, as in the case of the step-up converter according to the third embodiment shown in FIG. 5.

Figure 7:
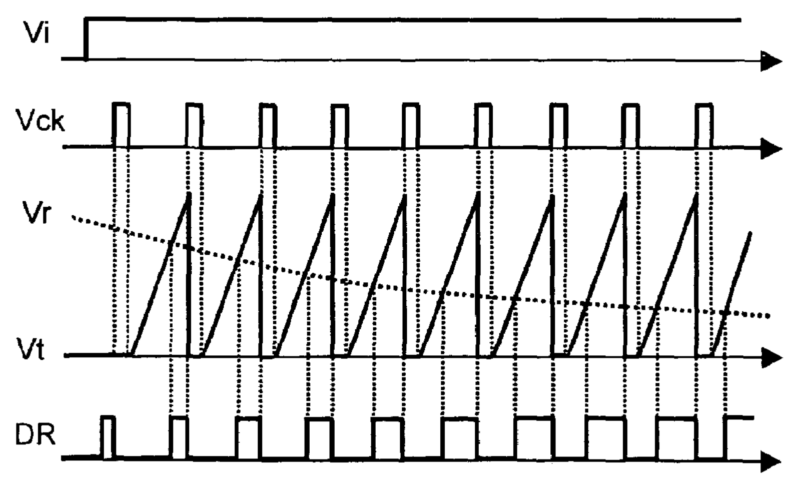
FIG. 7 is a waveform diagram showing the operations of the various sections of the control circuit of the DC-DC converter according to the fourth embodiment of the present invention.

At the time of startup, the DC-DC converter and its control circuit according to the fourth embodiment of the present invention operate differently from the DC-DC converter and its control circuit according to the third embodiment shown in FIG. 5. FIG. 7 is a waveform diagram showing the operations of the various sections of the control circuit 20B at the time of startup, showing the clock signal Vck, the triangular wave signal Vt, the reference signal Vr, and the drive signal DR. When it is assumed that the capacitor 232 is not charged at the time of startup, the potential of the resistor 231, that is, the level of the reference signal Vr, is high and has a potential close to the input voltage, immediately after the input DC voltage Vi is input. For this reason, the pulse width of the drive signal DR, obtained as the result of the comparison with the triangular wave signal Vt, becomes small. As time passes, the capacitor 232 is charged, and the level of the reference signal Vr lowers gradually. Hence, the pulse width of the drive signal DR becomes larger gradually.

As described above, the DC-DC converter and its control circuit according to the fourth embodiment of the present invention has an effect capable of facilitating the setting of soft start.

Fifth Embodiment

Figure 8:
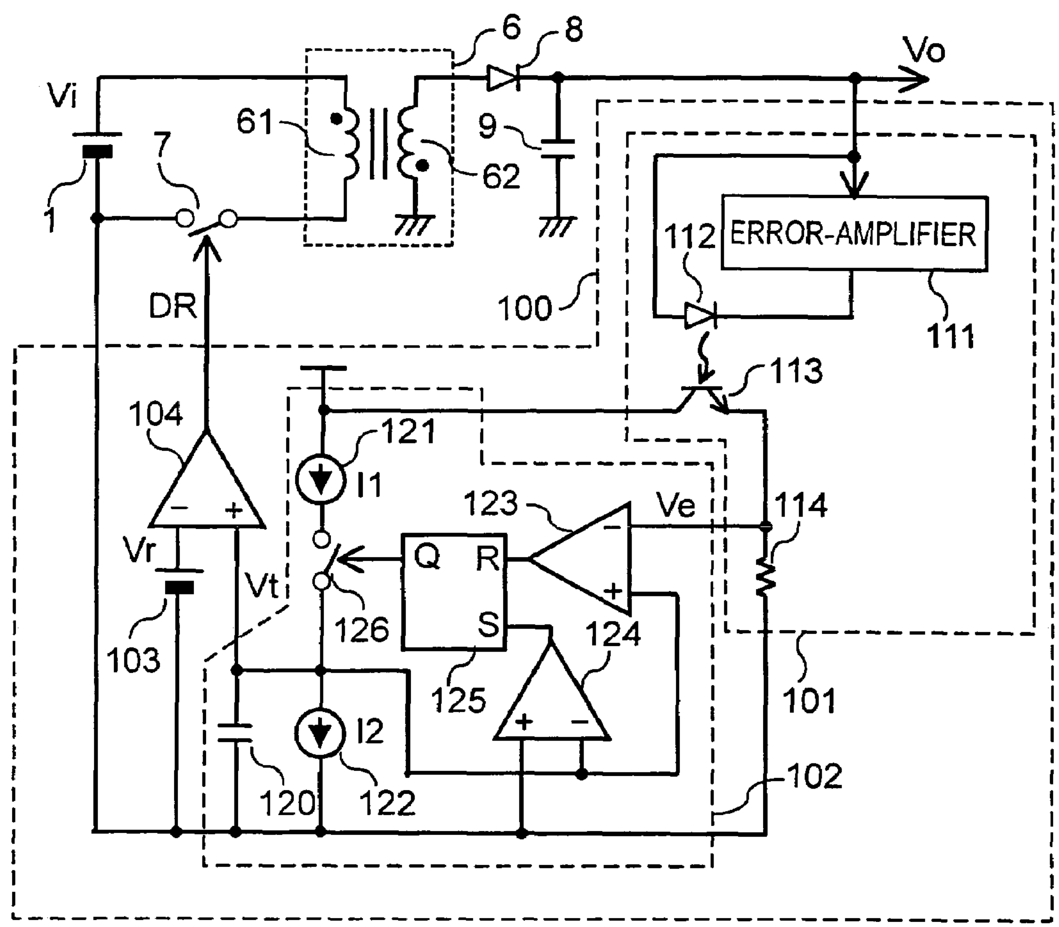
FIG. 8 is a circuit diagram showing the configuration of a DC-DC converter and its control circuit according to a fifth embodiment of the present invention.
Figure 9:
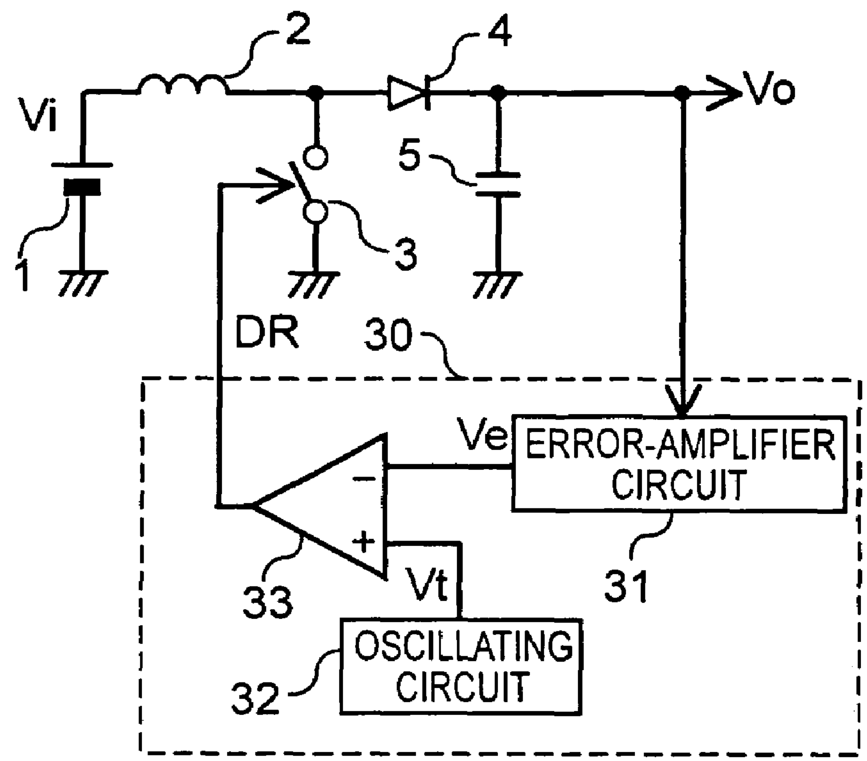
FIG. 9 is the circuit diagram showing the configuration of a conventional step-up DC-DC converter and its control circuit.
Figure 10:
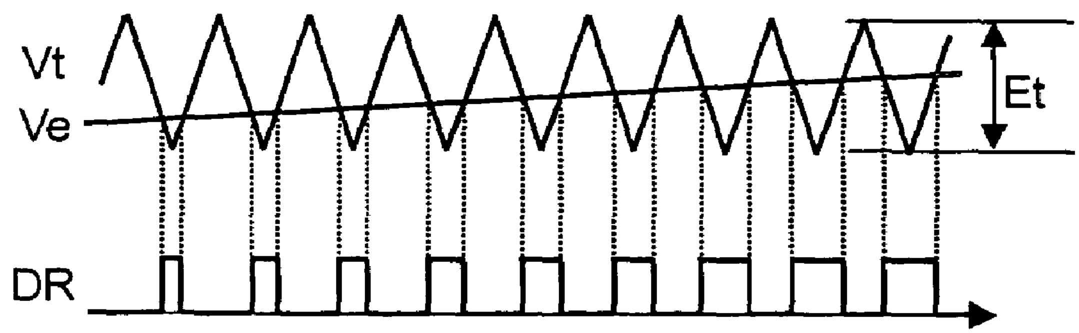
FIG. 10 is the waveform diagram showing the operations of the various sections of the control circuit of the conventional step-up converter shown in FIG. 9.
Figure 11:
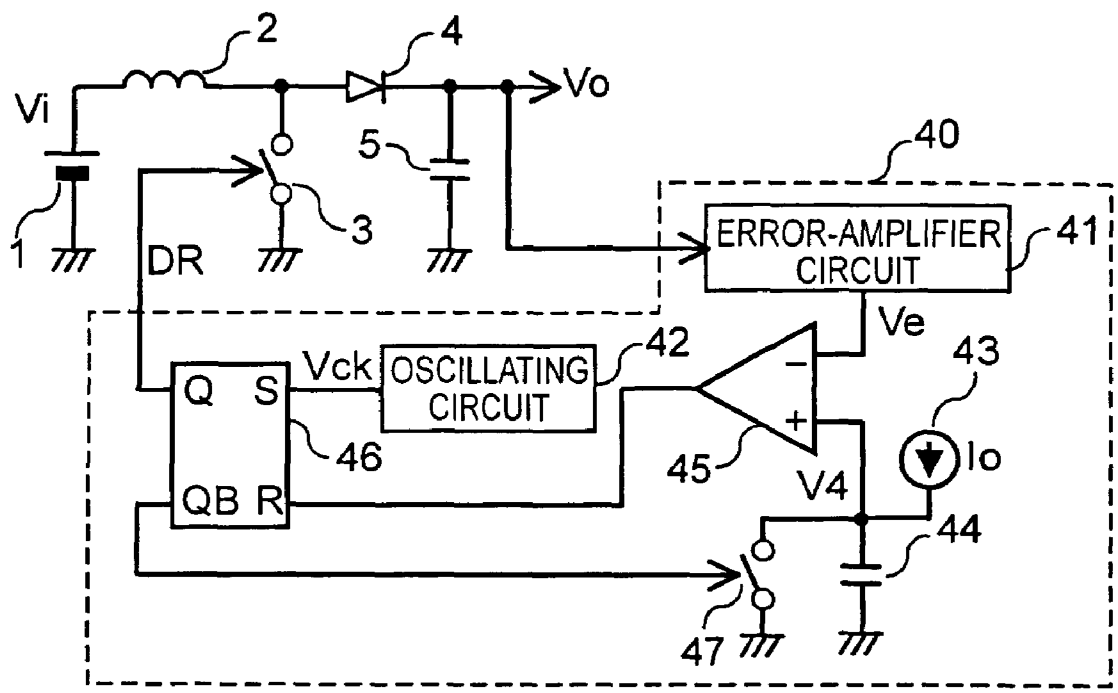
FIG. 11 is the circuit diagram showing the configuration of another conventional step-up DC-DC converter and its control circuit.
Figure 12:
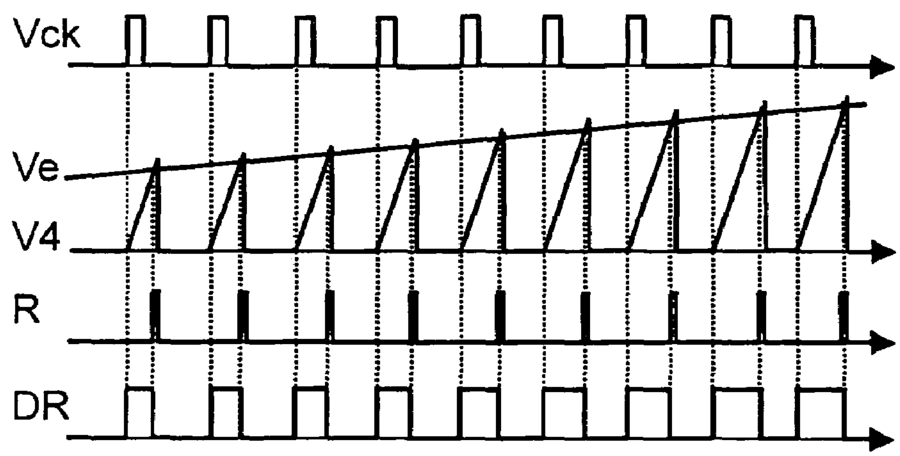
FIG. 12 is the waveform diagram showing the operations of the various sections of the control circuit of the other conventional step-up converter shown in FIG. 11.

Although a step-up converter is used to describe a DC-DC converter in the above-mentioned first to fourth embodiments, the present invention is not limited to such a step-up converter, as a matter of course. FIG. 8 is a circuit diagram showing the configuration of a DC-DC converter and its control circuit according to a fifth embodiment of the present invention. In FIG. 8, numeral 1 designates an input DC power supply formed of a battery, a circuit for rectifying and smoothing the commercial AC voltage, or the like. The input DC power supply 1 outputs an input DC voltage Vi. Numeral 6 designates a transformer having a primary winding 61 connected to the input DC power supply 1 and a secondary winding 62. It is assumed that the turn ratio between the number of turns N1 of the primary winding 61 and the number of turns N2 of the secondary winding 62 of the transformer 6 is n (=N2/N1). Numeral 7 designates a switching device formed of a MOSFET. The switching device 7 is connected to the primary winding 61. When the switching device 7 is ON, the input DC voltage is applied to the primary winding 61. Numeral 8 designates a rectifying means formed of a diode. Numeral 9 designates a smoothing means formed of a capacitor. The rectifying means 8 and the smoothing means 9 are connected to the secondary winding 62, rectify and smooth the voltage generated in the secondary winding 62, and output an output DC voltage Vo. The transformer 6, the switching device 7, the rectifying means 8 and the smoothing means 9 described above constitute a flyback converter. Numeral 100 designates a control circuit. The control circuit 100 detects the output DC voltage Vo, supplies a drive signal DR to the switching device 7, and controls the ON/OFF operation of the switching device.

In FIG. 8, the control circuit 100 comprises an error-amplifier circuit 101 for generating an error signal Ve that is obtained by amplifying the error between the output DC voltage Vo and a target value, an oscillating circuit 102 for generating a triangular wave signal Vt whose amplitude is the level of the error signal Ve, a voltage source circuit 103 for generating a reference signal Vr, and a comparison circuit 104 for comparing the triangular wave signal Vt with the reference signal Vr and for outputting the drive signal DR to turn ON/OFF the switching device 7. Furthermore, the error-amplifier circuit 101 comprises an error amplifier 111 that compares the output DC voltage Vo with the target value and amplifies the error therebetween, a photodiode 112 connected to the output of the error amplifier 111, a phototransistor 113 that outputs a current corresponding to the amount of light emitted from the photodiode 112, and a resistor 114 that converts the current of the phototransistor 113 into the error signal Ve. When the output DC voltage Vo begins to become larger than the target value, the error amplifier 111 increases the current flowing in the photodiode 112, thereby increasing the amount of light emitted from the photodiode 112. As a result, the current of the phototransistor 113 is increased, and the error signal Ve becomes larger. Moreover, the oscillating circuit 102 shown in FIG. 8 has the same configuration as that of the oscillating circuit 12 shown in FIG. 1.

The operation of the flyback converter will be described below. When the switching device 7 is ON, the input DC voltage Vi is applied to the primary winding 61 of the transformer 6. A current flows from the input DC power supply 1 to the primary winding 61 and the switching device 7, and energy is stored in the transformer 6. When the switching device i7 is turned OFF, the voltage across the primary winding 61 and the voltage across the secondary winding 62 of the transformer 6 are inverted. As a result, a current flows from the secondary winding 62 to the output via the rectifying means 8, and the energy stored in the transformer 6 is released. When it is assumed that the ratio (referred to as "duty ratio") of the ON time (the pulse width of the drive signal DR) in the switching cycle (the cycle of the triangular wave signal Vt) of the switching device 7 is D, the output DC voltage Vo is represented by $Vo=Vi \cdot n \cdot D/(1-D)$. The control circuit 100 detects the output DC voltage Vo and adjusts the duty ratio D so that the output DC voltage Vo reaches the target value.

The error signal Ve generated using the error-amplifier circuit 101 rises when the output DC voltage Vo is lower than the target value, and lowers when the output DC voltage Vo is higher than the target value. The error signal Ve is compared with the voltage (the triangular wave signal Vt) of the capacitor 120 using the comparator 123. When the output Q of the latch circuit 125 is high, the switch 126 is ON, whereby the capacitor 120 is charged using the constant current (I1−I2). When the voltage (the triangular wave signal Vt) of the capacitor 120 rises and reaches the error signal Ve, the output of the comparator 123 is inverted and becomes high, and the latch circuit 125 is reset. When the output Q of the latch circuit 125 becomes low, the switch 126 is turned OFF, and the capacitor 120 is discharged using the constant current I2. The voltage (the triangular wave signal Vt) of the capacitor 120 becomes lower than the error signal Ve, and the output of the comparator 123 becomes low. When the voltage (the triangular wave signal Vt) of the capacitor 120 lowers and reaches the ground potential, the output of the comparator 124 is inverted and become high, and the latch circuit 125 is set. When the output Q of the latch circuit 125 becomes high, the switch 126 is turned ON. As a result, the capacitor 120 is charged using the constant current (I1−I2). The above-mentioned operation is repeated, and the voltage (the triangular wave signal Vt) of the capacitor 120 becomes a triangular wave signal changing between the ground potential and the error signal Ve. When it is assumed that the electrostatic capacitance of the capacitor 120 is C1 and that $I1=2\times I2$, for the sake of simplicity, the cycle Ts of the triangular wave signal Vt is represented by $Ts=C1 \cdot Ve/I1$.

The triangular wave signal Vt is compared with the reference signal Vr using the comparison circuit 104. When the triangular wave signal Vt is higher than the reference signal Vr, the drive signal DR becomes high. The pulse width of the drive signal DR, that is, the ON time Ton of the switching device 3, is represented by $Ton=Ts \cdot (1-Vr/Ve)$. Hence, the duty ratio D is represented by $D=Ton/Ts=1-Vr/Ve$ and becomes higher as the error signal Ve rises. On the other hand, the output DC voltage Vo is represented by $Vo=Vi \cdot n \cdot D/(1-D)$. For example, when the output DC voltage Vo is lower than the target value, the error signal Ve rises, and the duty ratio D becomes higher accordingly. As a result, the duty ratio D is adjusted so that the output DC voltage Vo reaches the target value.

In the steady state of the converter, wherein the output DC voltage Vo is stabilized, the relationships represented by Expressions (15) and (16) described below are established.

$$Vo = Vi \cdot n \cdot D/(1-D) = n \cdot Vi \cdot (Ve - Vr)/Vr \quad (15)$$

$$\partial Vo/\partial Ve = n \cdot Vi/Vr \quad (16)$$

As described above, the present invention is applicable to not only a step-up converter but also a flyback converter comprising a transformer. In addition, the relationship between the error signal Ve and the output DC voltage Vo is linear, and the rate of change (∂Vo/∂Ve) does not depend on the level of the error signal Ve. Furthermore, the present invention has an effect that the maximum duty ratio Dmax can be set using the maximum value of the error signal Ve and the reference signal Vr. Moreover, although the control circuit of the DC-DC converter according to the first embodiment of the present invention is applied to the insulated flyback converter in the fifth embodiment, the control circuits of the DC-DC converters described in the second to fourth embodiments are also applicable to the insulated flyback converter in a similar way and produce similar effects. Still further, the DC-DC converter and its control circuit according to the present invention are applicable to step-up/down converters, such as inverting converters and SEPICs (single-ended primary inductance converters), in addition to the flyback converter, and produce similar effects.

In the respective embodiments described above, an apparatus comprising a DC-DC converter, which receives a DC input voltage and outputs a DC output voltage, and its control circuit has been described. However, the DC-DC converter according to each of the embodiments may be configured so as to include a control circuit.

What is claimed is:

1. A DC-DC converter having a switching device that is turned ON and OFF repeatedly, and an inductor that stores energy from the input during the ON period of said switching device and releases the energy to the output during the OFF period of said switching device, comprising:

an error-amplifier circuit for generating an error signal that is obtained by amplifying the error between the output and a target value, an oscillating circuit for generating a triangular wave signal having an amplitude corresponding to said error signal, and a comparison circuit for comparing said triangular wave signal with a reference signal having a predetermined value and for generating a drive signal to turn ON/OFF said switching device.

2. The DC-DC converter according to claim 1, wherein said oscillating circuit generates a triangular wave signal having an amplitude being proportionate to the magnitude of said error signal.

3. The DC-DC converter according to claim 2, wherein said oscillating circuit comprises:

a current source circuit for outputting a current being proportionate to the magnitude of said error signal, a clock signal generator for generating a clock signal having a predetermined frequency, a discharge switch that is turned ON and OFF according to said clock signal, and a capacitor that is charged using said current source circuit and discharged using said discharge switch; and said triangular wave signal has the waveform of the charging/discharging voltage of said capacitor.

4. The DC-DC converter according to claim 1, wherein said comparison circuit compares said triangular wave signal with a reference signal having a magnitude corresponding to the input voltage.

5. The DC-DC converter according to claim 1, wherein said comparison circuit compares said triangular wave signal with a reference signal having a magnitude that decreases from a level higher than said predetermined value at the time of startup to said predetermined value with the passage of time.

6. The control circuit of a DC-DC converter, having a switching device that is turned ON and OFF repeatedly, and an inductor that stores energy from the input during the ON period of said switching device and releases the energy to the output during the OFF period of said switching device, comprising:

an error-amplifier circuit for generating an error signal that is obtained by amplifying the error between the output and a target value, an oscillating circuit for generating a triangular wave signal having an amplitude corresponding to said error signal, and a comparison circuit for comparing said triangular wave signal with a reference signal having a predetermined value and for generating a drive signal to turn ON/OFF said switching device.

7. The control circuit of the DC-DC converter according to claim 6, wherein said oscillating circuit generates a triangular wave signal having an amplitude being proportionate to the magnitude of said error signal.

8. The control circuit of the DC-DC converter according to claim 7, wherein said oscillating circuit comprises:

a current source circuit for outputting a current being proportionate to the magnitude of said error signal, a clock signal generator for generating a clock signal having a predetermined frequency, a discharge switch that is turned ON and OFF according to said clock signal, and a capacitor that is charged using said current source circuit and discharged using said discharge switch; and said triangular wave signal has the waveform of the charging/discharging voltage of said capacitor.

9. The control circuit of the DC-DC converter according to claim 6, wherein said comparison circuit compares said triangular wave signal with a reference signal having a magnitude corresponding to the input voltage.

10. The control circuit of the DC-DC converter according to claim 6, wherein said comparison circuit compares said triangular wave signal with a reference signal having a magnitude that decreases from a level higher than said predetermined value at the time of startup to said predetermined value with the passage of time.

* * * * *